United States Patent
Lau et al.

(10) Patent No.: US 10,089,494 B2
(45) Date of Patent: Oct. 2, 2018

(54) SYSTEM AND METHOD FOR SECURING A NETWORK DEVICE

(71) Applicant: LGS Innovations, Inc., Herndon, VA (US)

(72) Inventors: David Lau, Elmhurst, IL (US); Gerald R. Thompson, Somerset, NJ (US); Gregory St.Louis, Geneva, IL (US); Steve Jacks, Villa Park, IL (US)

(73) Assignee: LGS Innovations LLC, Herndon, VA (US)

( * ) Notice: Subject to any disclaimer, the term of this patent is extended or adjusted under 35 U.S.C. 154(b) by 4 days.

(21) Appl. No.: 15/267,794

(22) Filed: Sep. 16, 2016

(65) Prior Publication Data

US 2017/0357593 A1 Dec. 14, 2017

Related U.S. Application Data (60) Provisional application No. 62/347,732, filed on Jun. 9, 2016.

(51) Int. Cl.
| | | |
|---|---|---|
| *G06F 13/12* | (2006.01) | |
| *G06F 21/62* | (2013.01) | |
| *G06F 21/51* | (2013.01) | |

(52) U.S. Cl.
CPC .......... *G06F 21/6281* (2013.01); *G06F 21/51* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 9,594,912 | B1* | 3/2017 | Thioux | G06F 21/577 |
| 2016/0299765 | A1* | 10/2016 | Wesie | G06F 9/4401 |
| 2017/0115994 | A1* | 4/2017 | Goodman | G06F 9/445 |
| 2017/0169216 | A1* | 6/2017 | Boehm | G06F 21/54 |

OTHER PUBLICATIONS

Ward (Web's random numbers are two weak, researcher warn, 2015, herein Ward).*
Executable, Wikepedia, 2016.*
Random Seed, Wikepedia, 2016.*
Linker, Wikepedia, 2016.*
What is the exact difference between dynamic loading and dynamic linking, Darcy 2013.*
Kil, Chongkyung et al.; "Address Space Layout Permutation (ASLP): Towards Fine-Grained Randomization of Commodity Software", 2006; pp. 1-10.
De Sutter, Bjorn et al.; "Instruction Set Limitation in Support of Software Diversity", 2009, pp. 1-14.
"OmniSwitch AOS Release 8 Network Configuration Guide", Part No. 060392-+10, Rev. B, Nov. 2015, pp. 1-1120.
Smith, Susan, "LGS Innovations Has Proactive Strategy to Fight Network Attacks", Aug. 2016, pp. 1-2.

* cited by examiner

*Primary Examiner* — Duc Doan
(74) *Attorney, Agent, or Firm* — Baker & Hostetler LLP (57) ABSTRACT

A network device is provided. The network device includes a processor and a memory with code thereupon. The code when executed by the processor causes the processor to provide object files referenced in the code, randomize an order of linking the object files in the code at a link time, and create a plurality of unique static images of a binary file based upon the randomized order.

20 Claims, 5 Drawing Sheets

SYSTEM AND METHOD FOR SECURING A NETWORK DEVICE

FIELD

The present application generally relates to computer networks and cyber-security, and particularly to systems and methods for securing a network device.

BACKGROUND

Computer communication networks face increasing levels of threats and exploitation all over the world. Conventional network devices such as network switches used in the computer networks handle various kinds of software code to implement various functionalities on the network. Hackers attempt to take advantage of vulnerabilities in network software code, for example, code that has not been updated and can be exploited. Often times, the manufacturer of such code does not know about the vulnerabilities, or if known, is unable to fix such vulnerabilities in time.

One conventional technique for securing networks is to use software diversification by randomizing address space layout. Such address space layout randomization has to be supported by the operating system (OS) of the network device, as well as by the software code itself. Typically, not all software code and not all OSs can support such address space layout randomization. Even when supported, address space layout randomization moves a whole block of instruction from a first memory space to a different second memory space in a random manner. However, if a hacker can obtain a starting address of the second memory space, then the whole address space layout is available to the hacker resulting in compromised security of the network.

Another conventional technique to provide security to networks is to use software diversification by moving sub-blocks of code to be executed on a network device to different or unique memory spaces. This technique randomizes the internal addresses of the code in the memory, but adds computational overhead to the software being executed. As a result, network latency is significantly increased.

Yet another conventional technique is to provide fine grained randomization of commodity software using address space layout permutation as outlined in the paper "Address Space Layout Permutation (ASLP): Towards Fine-Grained Randomization of Commodity Software," by Kil et al., *Proceedings of the 22nd Annual Computer Security Applications Conference,* ACSAC '06, pp. 339-348, Dec. 11-15, 2006. The ASLP technique laid out in this paper takes a final binary file of commodity software and passes that file through a software tool to create different instances of the binary file. However, such a process in which a final binary file after an original creation thereof is tampered with is considered invasive from a commercial software industry point of view. This is so since companies are hesitant to alter the final binary file of their software prior to distribution to customers as such alteration may result in instability and/or lost functionality of tested commercial software.

Various aspects of this application are directed towards addressing these and other drawbacks and challenges of conventional network security systems and methods.

SUMMARY

This summary is provided to introduce a selection of concepts in a simplified form that are further described below in the Detailed Description. This Summary is not intended to limit the scope of the claimed subject matter. The foregoing needs are met, to a great extent, by the present patent application directed to a system and a method for securing a network device. The present patent application will be discussed in more detail below.

In accordance with an aspect of the patent application, a network device is provided. The network device includes a processor and a memory with code thereupon. The code when executed by the processor causes the processor to provide object files referenced in the code, randomize an order of linking the object files in the code at a link time, and create a plurality of unique static images of a binary file based upon the randomized order.

In accordance with another aspect of the patent application, a method for securing a network is provided. The method includes providing object files referenced in a code. The method includes randomizing an order of linking the object files in the code at a link time. The method includes creating a plurality of unique static images of a binary file based upon the randomized order. The method includes distributing the plurality of unique static images respectively to one or more trusted network devices.

In accordance with yet another aspect of the patent application, a method for securing a network against cyber attacks is provided. The method includes receiving a source code at a network switch, the source code referencing object files in an initial order. The method includes compiling, at the network switch, the source code to obtain compiled object files in the initial order. The method includes calling, at the network switch, a linker. The method includes randomizing, at the network switch, the initial order of linking the object files in the source code by the linker at a link time. The method includes creating a plurality of unique static images of a binary file based upon the randomized order.

BRIEF DESCRIPTION OF THE DRAWINGS

In order to facilitate a more robust understanding of the patent application, reference is now made to the accompanying drawings, in which like elements are referenced with like numerals. These drawings should not be construed to limit the scope of the application and are for illustrative purposes only.

DETAILED DESCRIPTION

Various aspects of this patent application (hereinafter "application") will now be described with reference to the drawing figures, in which like reference numerals refer to like parts throughout. A detailed description of this application is provided in reference to various figures, embodiments and aspects herein. Although this description provides detailed examples of possible implementations, it should be understood that the details are intended to be examples and thus do not limit the scope of the application.

Figure 1:
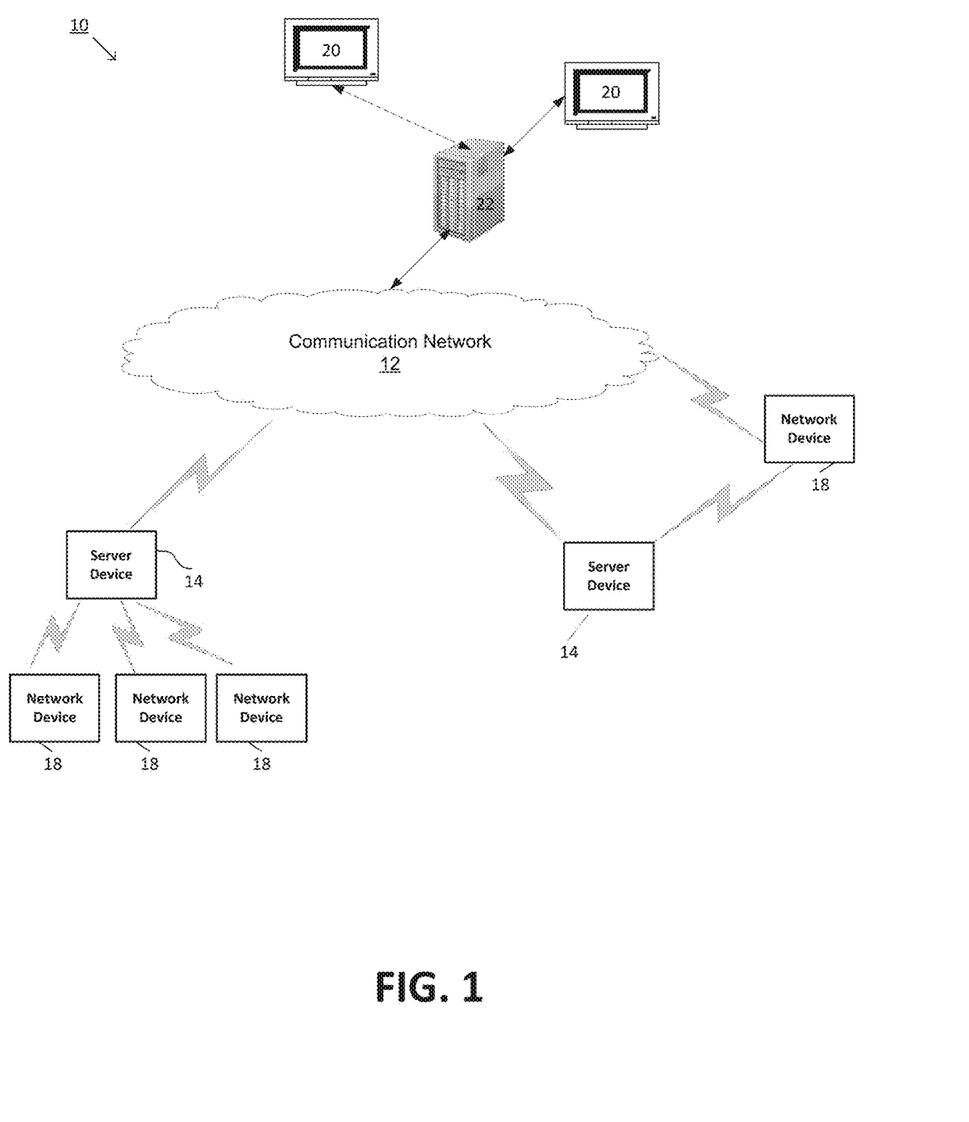
FIG. 1 illustrates an exemplary system for securing a network device, in accordance with an aspect of this patent application.

One or more aspects of this application are directed to systems and methods for securing a network device. Referring to FIG. 1, a general architecture of a system 10 for securing a network device is provided. The system 10 may include a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network, and the like, or combinations thereof, for example.

The system 10 includes a plurality of interconnected network devices. One such network device is a network switch 22 that is connected to the communication network 12. It will be appreciated by one of ordinary skill in the art that the system 10 may include additional network switches at other positions in the system 10. In one example, the network switch 22 may be a network router, operating, for example, in a WiFi environment, although additionally or optionally such a router may be part of a wired networking environment (e.g., Ethernet). Exemplary internal architecture of the network switch 22 is discussed with respect to FIG. 2 in which a block diagram of an exemplary computing system 90 implemented as the network switch 22 is illustrated. Computing system 90 of the network switch 22 may comprise a computer or a server and may be controlled primarily by computer readable instructions, which may be in the form of software, wherever, or by whatever means such software is stored or accessed. Such computer readable instructions may be executed within or at a central processing unit (CPU) 91 to cause the computing system 90 to do work including carrying out various features and functionalities described in this application. In many workstations, servers, and personal computers, central processing unit 91 is implemented by a single-chip CPU called a microprocessor. In other machines, the central processing unit 91 may comprise multiple processors. The computing system 90 may include a coprocessor 81 as an optional processor, distinct from the CPU 91 and performs additional functions or assists CPU 91. The CPU 91 and/or coprocessor 81 may receive, generate, and process data related to the disclosed systems and methods for securing one or more of the network devices of the system 10, including the network switch 22.

Figure 2:
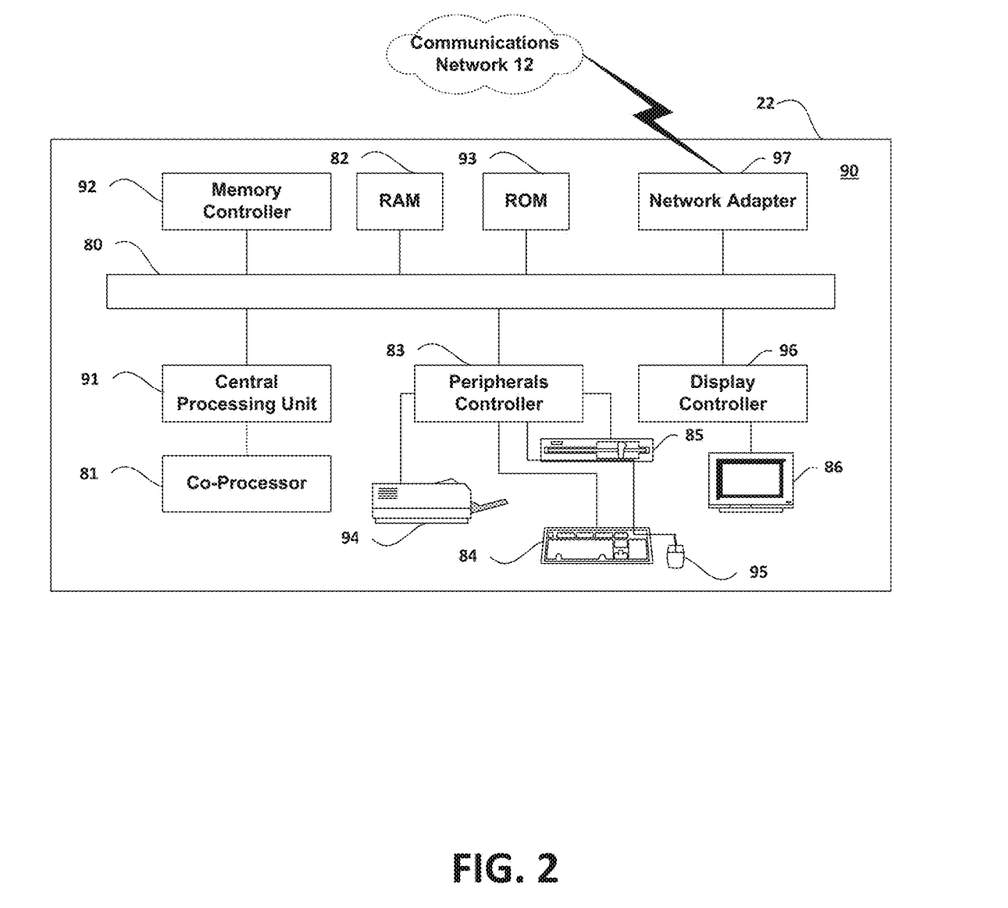
FIG. 2 illustrates an exemplary network switch, in accordance with an aspect of this patent application.

In operation, the CPU 91 fetches, decodes, and executes processor executable instructions, and transfers information to and from other resources via a main data-transfer path, i.e., a system bus 80 of the computing system 90. The system bus 80 connects the components in the computing system 90 and defines the medium for data exchange. The system bus 80 typically includes data lines for sending data, address lines for sending addresses, and control lines for sending interrupts and for operating the system bus 80. An example of the system bus 80 is the PCI (Peripheral Component Interconnect) bus.

Memory devices coupled to the system bus 80 include a random access memory (RAM) 82 and a read only memory (ROM) 93. Such memories include circuitry that allows information to be stored and retrieved. The ROM 93 generally contains stored data that cannot easily be modified. Data stored in the RAM 82 can be read or changed by the CPU 91 or other hardware devices. The RAM 82 and/or the ROM 93 may include address spaces for instructions and code that is executable by the CPU 91 and/or the coprocessor 81. Generally, the RAM 82 and/or the ROM 93 for computer readable storage media. Such computer readable storage media may be non-transitory and tangible. In addition to the RAM 82 and/or the ROM 93, the computer readable media may include, but are not limited to, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer, e.g., the computing system 90 of the network switch 22.

Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, the computing system 90 in the network switch 22 may contain a peripherals controller 83 responsible for communicating instructions from the CPU 91 to peripherals, such as a printer 94, a keyboard 84, a mouse 95, and a disk drive 85. Although not explicitly illustrated, the network switch 22 may include racks, heat sinks, cabinets, power supplies, etc., for appropriate functioning and placements of components of the network switch 22. By way of example only and not by way of limitation, the network switch 22 may be one of an OMNI® series of switches provided by Alcatel-Lucent Enterprises of New Jersey.

A display 86, which is controlled by the display controller 96, is used to display visual output generated by the computing system 90. Such visual output may include text, graphics, animated graphics, and video. This may include, for example, discovery results for multi-hop discovery, conditional discovery and hosting redirects. The display 86 may be implemented with a CRT-based video display, an LCD-based flat-panel display, gas plasma-based flat-panel display, or a touch-panel. The display controller 96 includes electronic components required to generate a video signal that is sent to the display 86. The display 86 may display sensory data in files or folders using embedded semantics names. Further, the computing system 90 may contain a network adaptor 97 that may be used to connect the computing system 90 to an external communications network, such as the communication network 12 of FIG. 1.

Referring back to FIG. 1, the network switch 22 is further connected to a plurality of user devices 20. Non-limiting examples of such user devices may be personal computers, client devices, mobile computing platforms, proxy server devices, tablet computing devices, cellular phones, fixed landline phones, Voice Over Internet Protocol (VOIP) devices, additional network switches similar to network switch 22, and the like or combinations thereof.

Figure 3:
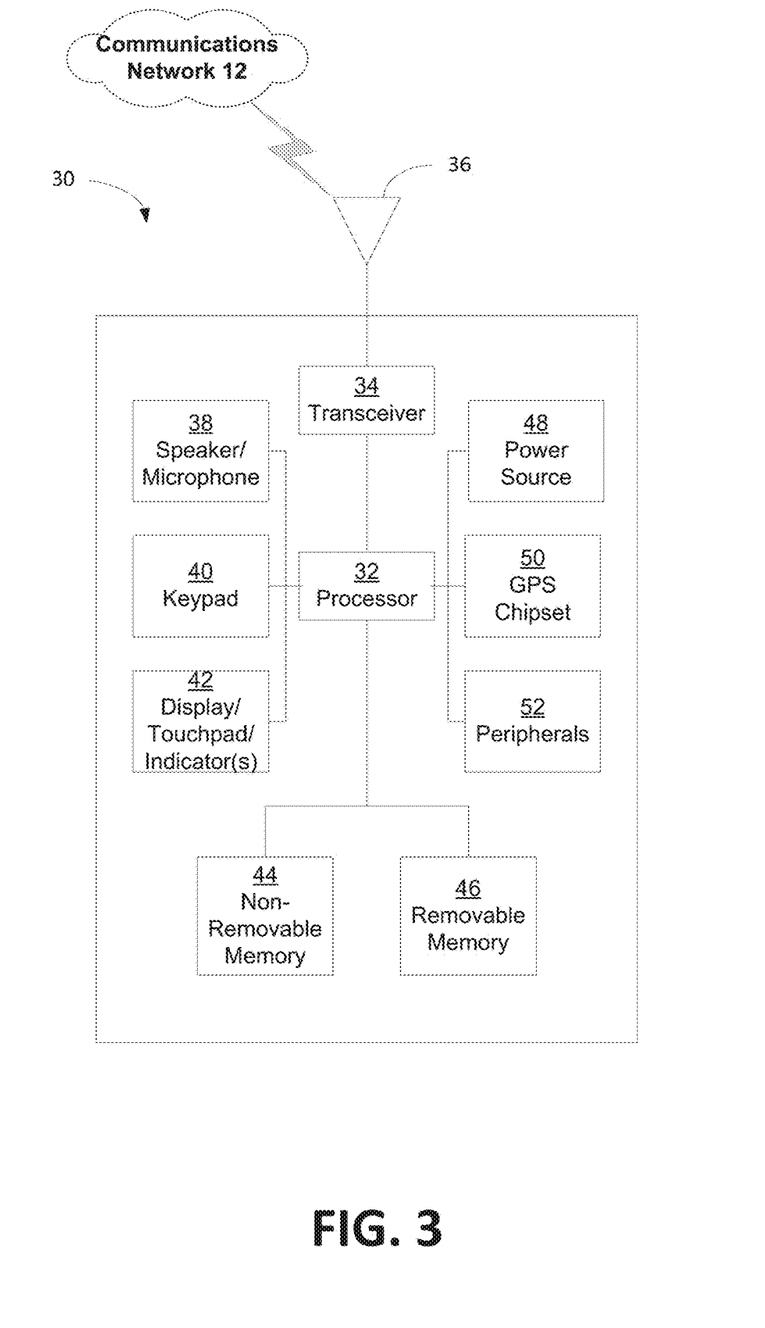
FIG. 3 illustrates an exemplary network device, in accordance with an aspect of this patent application.

The communication network 12 includes other network devices such as servers 14 (interchangeably referred to as server devices 14) and terminal devices 18 connected to the communication network 12 via the servers 14 or directly. Such terminal devices may be computers, servers, proxy servers, mobile devices, phones, and the like. FIG. 3 illustrates a system diagram of an example network device 30, such as the terminal devices 18 or the servers 14, for example. In one aspect, the network device 30 may be the network switch 22. One of ordinary skill in the art will appreciate in view of this patent application that consistent with the context, the terms "device" and "switch", as applied to the network device 30 and the network switch 22, may be interchangeable.

As shown in FIG. 3, the network device 30 may include a processor 32 (similar to the CPU 91 in FIG. 2), a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the network device 30 may include any sub-combination of the foregoing elements while remaining consistent with an aspect of this application including but not limited to different types of computers, systems (software, hardware, and/or combinations thereof), servers, devices, etc.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the network device 30 to operate in a wireless environment. The processor 32 may be coupled to the transceiver 34, which may be coupled to the transmit/receive element 36. While FIG. 3 depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access network (RAN)-layer programs and/or communications. The processor 32 may perform security operations such as authentication, security key agreement, and/or cryptographic operations, such as at the access-layer and/or application layer, for example.

The transmit/receive element 36 may be configured to transmit signals to, or receive signals from, a network switch 22. For example, in an aspect, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 3 as a single element, the network device 30 may include any number of transmit/receive elements 36. More specifically, the network device 30 may employ MIMO technology. Thus, in an aspect, the network device 30 may include two or more transmit/receive elements 36, e.g., multiple antennas, for transmitting and receiving wireless signals. The transceiver 34 may be configured to modulate the signals that are to be transmitted by the transmit/receive element 36 and to demodulate the signals that are received by the transmit/receive element 36. As noted above, the network device 30 may have multi-mode capabilities. Thus, the transceiver 34 may include multiple transceivers for enabling the network device 30 to communicate via multiple RATs, such as UTRA and IEEE 802.11, for example.

The processor 32 may access information from, and store data and code (e.g., software code) in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other aspects, the processor 32 may access information from, and store data in, memory that is not physically located on the network device 30, such as on a server or a home computer.

The processor 32 may receive power from the power source 48, and may be configured to distribute and/or control the power to the other components in the network device 30. The power source 48 may be any suitable device for powering the network device 30. For example, the power source 48 may include one or more dry cell batteries, e.g., nickel-cadmium (NiCd), nickel-zinc (NiZn), nickel metal hydride (NIMH), lithium-ion (Li-ion), etc.), solar cells, fuel cells, and the like.

The processor 32 may also be coupled to the chipset 50 (e.g., a GPS chipset), which is configured to provide location information, e.g., longitude and latitude, regarding the current location of the network device 30. It will be appreciated that the network device 30 may acquire location information by way of any suitable location-determination method while remaining consistent with an aspect of this application.

The processor 32 may further be coupled to the other peripherals 52, which may include one or more software and/or hardware modules that provide additional features, functionality and/or wired or wireless connectivity. For example, the other peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4:
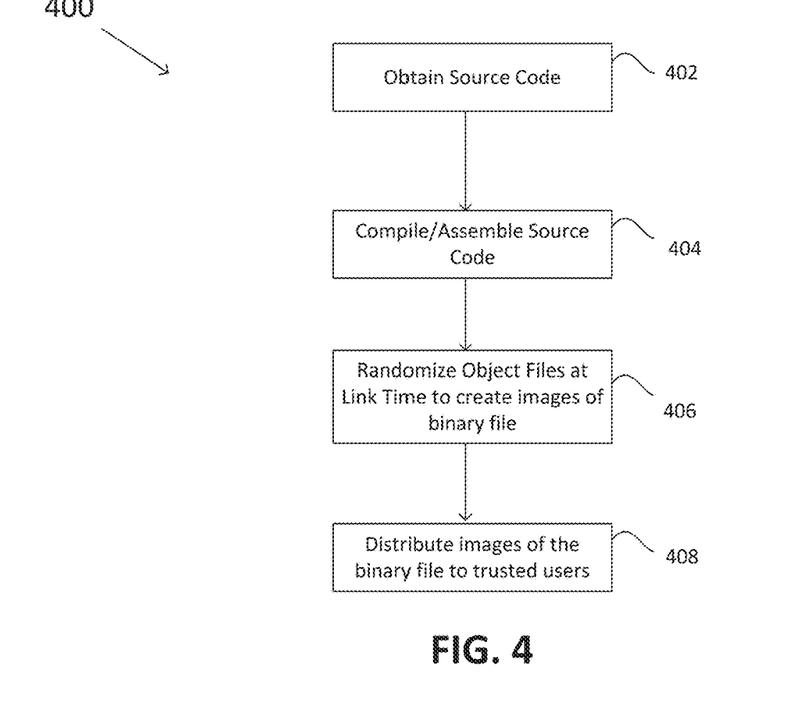
FIG. 4 illustrates a method for securing a network device, in accordance with an aspect of this patent application.

FIG. 4 illustrates an example flowchart of a method 400 for securing a network device of the system 10 (e.g., the network switch 22 and/or the network device 30), in accordance with an aspect of this application. FIG. 4 presents the method 400 as a flow diagram, although the method 400 may be understood using other types of presentations in addition to or as an alternative to the flowchart of FIG. 4, such as process diagrams, graphs, code, charts, equations, timing diagrams, etc. In one aspect, one or more processes or operations in the method 400 may be carried out at the network switch 22 and/or the network device 30. The method 400 may at least partially be implemented by executing the computer executable instructions stored in an internal memory of the network switch 22 and/or the network device 30.

In yet another aspect, in the method 400, one or more processes or operations, or sub-processes thereof, may be skipped or combined as a single process or operation, and a flow of processes or operations in the method 400 may be in any order not limited by the specific order illustrated in FIG. 4. For example, one or more processes or operations may be moved around in terms of their respective orders, or may be carried out in parallel. The term "flow," as used with respect to FIG. 4, generally refers to a logical progression of operations in an exemplary manner carried out at the network switch 22 and/or the network device 30. However, such a flow is by way of example only and not by way of limitation, as at a time, the flow may proceed along multiple operations or processes of the method 400. The method 400 may be implemented by the network switch 22 and/or the network device 30 in a high level or a low level programming language (e.g., C++, assembly language, etc.) using logic circuitry therein (e.g., programmable logic circuit (PLC), etc.) and by executing the computer executable instructions. The method 400 may be implemented as a software application, a hardware implementation, and/or combinations thereof. In one aspect, the internal memory may include a non-transitory computer readable medium. The non-transitory computer readable medium may include instructions thereupon, which when executed by the network switch 22 and/or the network device 30 cause the network switch 22 and/or the network device 30 to implement the method 400.

The method 400 may begin in an operation 402 in which a source code ("code") that is to be executed by network switch 22 and/or the network device 30 is obtained. The source code may be present in a memory of the network switch 22 and/or the network device 30, or may be obtained from another device over the communication network 12. Alternatively, the source code may be received from a third party or an external provider via a wired or a wireless channel, or over fixed memory devices such as a compact disk (CD) or a USB drive. As discussed, the source code may be in a programming language or may be written in assembly language. The source code may refer to various object files and libraries that may be stored at different addresses of the RAM 82, the ROM 93, the removable memory 46, and/or the non-removable memory 44, or other memory devices in the system 10. The source code may include reference to object files and libraries. Such reference to the object files and the libraries is a specific order originally provided by a manufacturer or an author of the source code.

For purposes of this application, an actual output of the source code is immaterial. Rather, it will be appreciated by one of ordinary skill in the art that an execution of the source code results in an executable binary file that is further executed to achieve the output of the source code. Further, such execution of the binary file may typically be carried out at different devices, each having a copy of the binary file. In one aspect of this application, such copies or images of the binary file are unique to the device in question.

Figure 5:
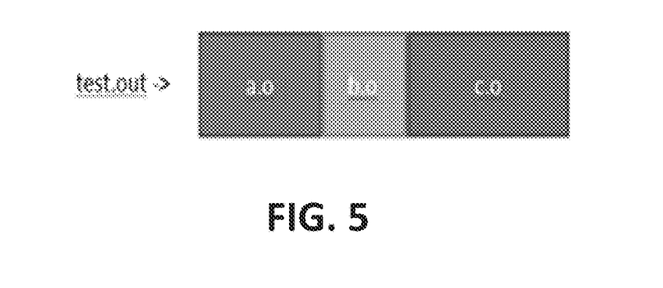
FIG. 5 illustrates an original order of object files referenced in a source code, in accordance with an aspect of this patent application.

In an operation 404, the source code is compiled or assembled by a compiler or an assembler, respectively, as the case may be. The compiler or the assembler may obtain the object files and/or the libraries from an appropriate memory location as specified by the source code. The compiler may be a high level programming language compiler (e.g., a C++ compiler) or a microprocessor chip level assembler (e.g., an INTEL® x86 Assembler). Upon compilation or assembly of the source code, a set of compiled or assembled object files are created in a sequential order. One such exemplary order is illustrated in FIG. 5 in which a compiler output file "test.out" includes object files "a.o", "b.o" and "c.o" positioned as the first, second and third object files, respectively, that were compiled or assembled by the compiler or assembler and were referenced in the same order by the source code. It will be appreciated that any number of object files and libraries may be referenced in the source code, and the three object files illustrated herein are by way of example only and not by way of limitation.

Conventionally, this exemplary original order of the object files is maintained when a linker or a linker program calls the compiled or assembled object files. In the conventional technique of not changing the order of the compiled or assembled object files, if a hacker can obtain the original order of the compiled or assembled file, then the hacker can exploit the knowledge of the original order of the files to compromise the functionality of the source code at all instances of execution of the source code.

Figure 6:
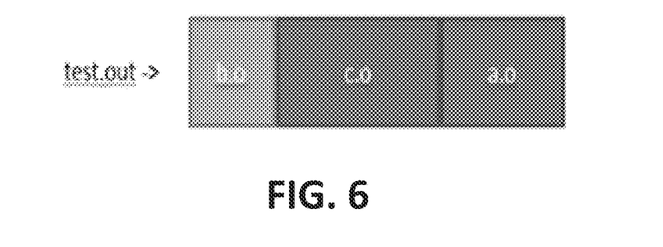
FIG. 6 illustrates a shuffled order of object files at link time, in accordance with an aspect of this patent application.

In an operation 406, when a linker calls the compiled or assembled object files "a.o", "b.o" and "c.o" at a link time, the original order of the compiled or assembled object files "a.o", "b.o" and "c.o" is shuffled. For example, as shown in FIG. 6, the linker may combine the compiled object files "a.o", "b.o" and "c.o" in a different order indicated as "b.o", "c.o" and "a.o" to create a unique image of the original binary file. Again, since the examples of FIGS. 5 and 6 use only three object files, it will be appreciated by one of ordinary skill in the art that with a large number of files, for example, 100 object files, a large number ($\leq$100!) of unique static images of the original binary file may be created at link time. Such uniqueness of the order of the object files and hence the images of the binary file may be implemented using, for example, circular permutation techniques, derangement permutation techniques, or fixed-point free permutation techniques in which each object file is linked in any order different from any other order of linking, making each order of linking, and hence the resulting image of the binary file, unique. That is, each object file at link time is linked at a position different from the original order of linking referenced in the source code. Since the order of compiled or assembled object files used at link time to create unique copies of the binary file is different for each permutation of the set of available compiled or assembled object files, sections (or, component locations) of one copy of the binary file will be uniquely different from sections of another binary file.

Figure 7:
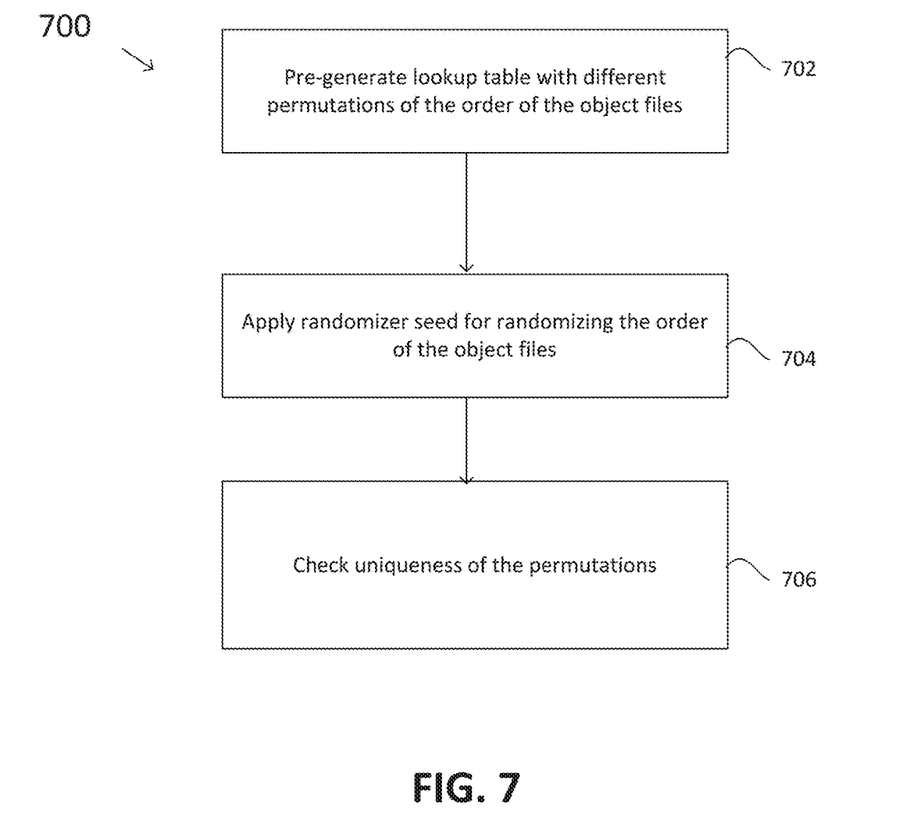
FIG. 7 illustrates a randomization procedure used for shuffling the object files, in accordance with an aspect of this patent application.

FIG. 7 illustrates a randomization procedure 700 for ensuring that each sequence of compiled or assembled object files is unique and does not overlap with a previous permutation such that each static image or copy of the binary file is unique. In one aspect of this patent application, the randomization procedure 700 may be applied only after compilation of the object files when a linker program calls the object files to create a particular binary file. That is, the randomization procedure 700 may not be applied to the object files before they are compiled. This may be true in a scenario where the source code may have the object files in an original order prior to compilation and altering this original order prior to compilation may result in erroneous compilation.

To facilitate the unique randomization within each image of the binary file, in an operation 702, the randomization procedure 700 uses a pre-generated lookup table that defines the different permutations to be used for ordering the compiled or assembled object files at a link time. Defining the permutations of the order of the compiled or assembled object files ahead of link time gives more control over how the images of binary file are structured. This allows for de-confliction of permutations between different diversified releases of the binary file and maintains uniqueness of the randomized order of the binary files, as well as provides the ability to avoid a situation where only partial randomization of the order in which the object files are linked occurs.

In an operation 704, such generating of the look-up table makes use of a function that utilizes a user defined seed to ensure that the look-up table creation process is repeatable. The seed may then be called by the network device 30, the network switch 22, and/or any other device in the system 10 as an input of a randomization function. In an exemplary aspect, a built-in higher level programming language (e.g., Python) having a randomization library function may be utilized or executed by a processor (e.g., the CPU 91) to implement specific randomization techniques. In one aspect of this application, such generating of the lookup table includes defining the number of diversified releases of the binary file to be supported by a given lookup table. When building the lookup table, the randomization function will check each randomly generated permutation against permutations for past releases of the binary file to ensure that each image has a unique order of the object files linked at link time. For example, at a given link time, the permutation of the compiled object files may be unique. However, that permutation may have been used at a previous instance when the linker initiated a call to the object files (e.g., from a command line interface (CLI)). Accordingly, the randomization procedure 700 may attach a flag or an indicator in the look up tables generated for each permutation, indicating whether or not for a particular instance of the source code, a particular permutation of the object files has previously been utilized.

In an operation 706, the randomization procedure 700 checks for the uniqueness of each permutation of the object files such that there is no overlap in the sections of the binary file images that are created upon linking the object files. For example, the randomization function may determine the first order of the object files may be "a.o", "b.o", and "c.o" (as shown in FIG. 5), a second order may be "b.o", "c.o", and "a.o" (as shown in FIG. 6), and a third order (not shown) may be "a.o", "c.o", and "b.o". In this example, the third order may be rejected since the compiled object file "a.o" is in the same position as that for the first order (i.e., in the first position). Likewise, additional orders of the object files "a,o", "b.o", and "c.o" in which at least one of the object files "a.o", "b.o", and "c.o" has not moved to another position may be rejected as a case of partial randomization. Therefore, the randomization procedure 700 will ensure that in each rearranged order of the object files, each object file is at a different location in the diversified release of the images than it was in the non-diversified binary file. As a result of the object files being linked in a different order than an original order, sections or component locations of the executable binary files (i.e., unique static images of the binary file corresponding to the original order) differ. Hence, the address space ordering for the binary image files when they are executed in different for different execution instances, which fails or reduces the chances of success of address space layout based attacks on the system 10, without adding any computational overheads, or without altering the boot code or the functionality of the source code of a software.

In one aspect of this application, depending on the number of object files and libraries that are being linked, the number of diversified releases of the binary file to support may exceed the number of valid permutations of the object files or libraries. In this case, the randomization procedure 700 will ensure that each valid permutation is utilized before allowing a repeat permutation, as and when the need arises (e.g., when the number of binary files to be distributed is limited to a closed limited group of trusted users or network devices, for example, 10 users or 10 network devices).

Referring back to the flowchart of FIG. 4, in an operation 408, the unique static images of the binary file are distributed to various network devices (e.g., the network switch 22) that utilize an output of the source code. For example, each binary file that is a unique static image of the binary file created from the original order of the compiled or assembled object file is executed on the network device 30 and/or the network switch 22. Then, when each such unique binary file is executed, the address space for each such binary file is different. Therefore, even if a hacker has the original order of the object file and/or the original copy of the binary file created by the linker from this original order of the object files, the hacker will be unable to exploit all the network devices that execute the unique static images of the binary file. Accordingly, an address space based attack on the original binary file will fail for most, if not all, of the unique static images of the binary file. Such distribution of the plurality of unique static images is carried out respectively to one or more trusted network devices. For example, the unique static images may be distributed respectively to server devices 14, each of which may be accessible to a limited number of network administrators. That is, each of the server devices 14 may have a unique copy of the binary file with sections or component locations uniquely rearranged for that particular copy or image based upon the randomized order of the object files that were compiled previously at, for example, the network switch 22.

Advantageously, various aspects of this application make a compiled binary less susceptible to exploitable vulnerabilities that rely on deterministic memory addressing. The method 400 attains source code diversification by rearranging sections of a binary file by randomizing the linked order of the object files and libraries during link-time. This causes the layout of sections within the diversified binary file to differ from the standard non-diversified release of the binary file. As a result, address-dependent exploits written against the non-diversified release of the binary file will likely fail against the diversified release of the binary file.

The process of diversification as implemented by the method 400 has no effect on the performance or functionality of the underlying software/source code. Because the sections of the binary file are only rearranged, the instructions and data of the source code are not modified. Further, because the reordering of the object files that link to create the binary file is done at link time, any address references reflect the rearrangement.

The protections offered by such source code diversification are further enhanced when distribution of a diversified release of the binary file is limited to a small number of trusted users, although aspects of this application are not limited to such a release to a small number of trusted users. Limiting the release of diversified binaries to trusted entities reduces the likelihood of the binary file being reverse engineered for malicious purposes. To facilitate this, the diversification process creates multiple diversified releases, each of which uniquely randomizes the layout of the binaries used in a software application. Each of these distinct diversified releases can then be provided to a different subset of end users, preventing the need for wide distribution of a single release of the binary file.

An exemplary advantage of the aspects of this patent application is that approximately 90% to up to 100% of the source code base may be diversified using different binary file images to secure a network against cyber attacks. One such diversification may exclude the boot code, while another alternative diversification may include the boot code. Further, code re-use attacks that depend on known code instruction address space layout are made much more difficult, if not impossible.

The present description is for illustrative purposes only, and should not be construed to narrow the breadth of the present patent application in any way. Thus, those skilled in the art will appreciate that various modifications might be made to the presently disclosed embodiments without departing from the full and fair scope and spirit of the present application. Other aspects, features and advantages will be apparent upon an examination of the attached drawings and appended claims.

What is claimed is:

1. A network device, comprising:
a processor and a memory with code thereupon, the code which when executed by the processor causes the processor to:
provide object files referenced in the code;
generate a look-up table defining different permutations of an order of linking the object files;
determine if one of the different permutations has been previously utilized;
dynamically attach an indicator in the look-up table for the one different permutation that has been previously utilized;
randomize the order of linking the object files in the code at a link time based upon the dynamically attached indicator; and
create a plurality of unique static images of a binary file based upon the randomized order.

2. The network device of claim 1, wherein the processor is further configured to randomize the order of linking the object files in the code upon a calling of a linker at the network device.

3. The network device of claim 1, wherein the processor is further configured to randomize the order of linking the object files in the code such that each of the object files is linked at a different position than a position referenced in the code.

4. The network device of claim 1, wherein the processor is further configured to provide the object files referenced in the code by compiling the object files at a compiler to obtain compiled object files.

5. The network device of claim 1, wherein the processor is further configured to: generate the look-up table by applying a randomizer seed to randomize an initial order of the object files, and verify a uniqueness of the randomized order of the object files.

6. The network device of claim 1, wherein the processor is further configured to create the plurality of unique static images of the binary file by verifying that each binary file in the plurality of unique static images has component locations different from original component locations of the binary file.

7. The network device of claim 1, wherein the processor is further configured to: distribute the plurality of unique static images respectively to one or more trusted network devices.

8. The network device of claim 1, wherein the network device is a network switch.

9. The network device of claim 1, wherein the code which when executed by the processor further causes the processor to repeat the determine and dynamically attach instructions based upon the dynamically attached indicator before the randomize instruction.

10. A method for securing a network, the method comprising:
providing object files referenced in a code;
generating a look-up table defining different permutations of an order of linking the object files;
determining if one of the different permutations has been previously utilized;
dynamically attaching an indicator in the look-up table for the one different permutation that has been previously utilized;
randomizing the order of linking the object files in the code at a link time based upon the dynamically attached indicator;
creating a plurality of unique static images of a binary file based upon the randomized order; and
distributing the plurality of unique static images respectively to one or more trusted network devices.

11. The method of claim 10, wherein the randomizing step is performed upon a calling of a linker at a network device.

12. The method of claim 10, wherein the randomizing step is performed such that each of the object files is linked at a different position than a position referenced in the code.

13. The method of claim 10, wherein the providing step includes compiling the code at a compiler to obtain the object files as compiled.

14. The method of claim 10, wherein the generating step includes: applying a randomizer seed to an initial order of the object files for the randomizing step; and verifying a uniqueness of the randomized order of the object files.

15. The method of claim 10, wherein the creating step includes verifying that each binary file in the plurality of unique static images has component locations different from original component locations of the binary file.

16. The method of claim 10, further comprising:
repeating the determining and dynamically attaching steps based upon the dynamically attached indicator before the randomizing step.

17. A method for securing a network against cyber attacks, the method comprising:
receiving a source code at a network switch, the source code referencing object files in an initial order;
compiling, at the network switch, the source code to obtain compiled object files in the initial order;
calling, at the network switch, a linker;
generating a look-up table defining different permutations for linking the object files based upon the initial order;
determining if one of the different permutations has been previously utilized;
dynamically attaching an indicator in the look-up table for the one different permutation that has been previously utilized;
randomizing, at the network switch, the initial order of linking the compiled object files in the source code by the linker at a link time based upon the dynamically attached indicator; and creating a plurality of unique static images of a binary file based upon the randomized order.

18. The method of claim 17, wherein the randomizing step is performed such that each of the compiled object files is linked at a different position than a position referenced in the source code.

19. The method of claim 17, wherein the generating step includes:
   applying a randomizer seed to the initial order of the compiled object files for the randomizing step; and
   verifying a uniqueness of the randomized order of the compiled object files.

20. The method of claim 17, further comprising: distributing the plurality of unique static images respectively to one or more trusted network devices.

* * * * *